(12) United States Patent
Sato et al.

(10) Patent No.: US 6,937,438 B2
(45) Date of Patent: Aug. 30, 2005

(54) THIN FILM MAGNETIC HEAD HAVING CONDUCTIVE PAD INCLUDING INSULATING PROTECTIVE LAYERS

(75) Inventors: Kiyoshi Sato, Niigata-ken (JP); Toru Takahashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 73 days.

(21) Appl. No.: 10/376,870

(22) Filed: Feb. 27, 2003

(65) Prior Publication Data

US 2003/0165030 A1 Sep. 4, 2003

(30) Foreign Application Priority Data

Mar. 1, 2002 (JP) ....................................... 2002-055833

(51) Int. Cl.$^7$ ........................... G11B 5/60; G11B 15/64; G11B 17/32; G11B 21/20
(52) U.S. Cl. .................................................. 360/234.5
(58) Field of Search .......................... 360/234.5, 234.3, 360/234, 230, 322, 320

(56) References Cited

U.S. PATENT DOCUMENTS

| | | | |
|---|---|---|---|
| 4,759,118 A | 7/1988 | Nakashima | 29/603.14 |
| 5,912,790 A | 6/1999 | Yoda et al. | 360/322 |
| 6,256,170 B1 * | 7/2001 | Honda | 360/234.5 |

* cited by examiner

Primary Examiner—Julie Anne Watko
(74) Attorney, Agent, or Firm—Brinks Hofer Gilson & Lione

(57) ABSTRACT

A thin film magnetic head is provided that includes bumps capable of securing high conductivity. The thin film magnetic head includes a coil layer for inducing a recording magnetic field between lower and upper core layers, a lead conductor layer for supplying a current to the coil layer, a conductive protective layer deposited on the lead conductor layer, a conductive bump formed on the conductive protective layer, and an insulating protective layer formed around the conductive protective layer and the conductive bump. The insulating protective layer includes a first insulating protective sub-layer formed around the conductive protective layer, the surface thereof being coplanar with the surface of the conductive protective layer, and a second insulating protective sub-layer formed separately from the first insulating protective sub-layer after the conductive bump is formed.

11 Claims, 15 Drawing Sheets

THIN FILM MAGNETIC HEAD HAVING CONDUCTIVE PAD INCLUDING INSULATING PROTECTIVE LAYERS

This application claims the benefit of priority to Japanese Patent Application 2002-055833, filed on Mar. 1, 2002.

BACKGROUND OF THE INVENTION

1. Field of the Invention

The present invention relates to a thin film magnetic head comprising bumps, and a manufacturing method therefor.

2. Description of the Related Art

A thin film magnetic head comprises an electrode section for supplying a current to a coil layer for inducing a recording magnetic field between upper and lower core layers, and to a magnetoresistive element for detecting a leakage magnetic field from a recording medium. The electrode section comprises lead conductor layers conductively connected to the coil layer and the magnetoresistive element, electrode pad layers for external connection, and bumps for conductively connecting the lead conductor layers to the electrode pad layers. The electrode section is conventionally formed by the process described below.

First, the lead conductor layers conductively connected to the coil layer and the magnetoresistive element are formed, and a conductive protective layer is formed in a region of the lead conductor layers, in which each bump is to be formed. Next, the bumps each having an umbrella sectional shape are formed on the conductive protective layers, and an insulating protective layer composed of alumina or silicon dioxide is formed over the entire surface including the bumps. Then, the insulating protective layer is polished to expose the tops of the bumps, and the electrode pad layers composed of a conductive material such as Au or the like are formed on the bumps. In this manner, the electrode section is formed.

However, as shown in FIG. 16, the above-described conventional manufacturing method has the problem of producing portions (spaces γ) without an insulating protective layer 20' on both sides of a conductive protective layer 15'. Such spaces γ cause corrosion of a bump 16' with a polishing solution which gathers at the time of a polishing work for exposing the top of the bump 16'. Therefore, the bump 16' becomes non-conductive, and thus a current cannot be supplied to a coil layer and a magnetoresistive element through a lead conductor layer 10'.

SUMMARY OF THE INVENTION

Accordingly, the present invention has been achieved in consideration of the above-described situation, and it is an object of the present invention to provide a thin film magnetic head comprising a bump capable of securing good conductivity, and a method of manufacturing the thin film magnetic head.

In the present invention, attention is paid to the fact that a region without an insulating protective layer can be narrowed by eliminating a step formed between a lead conductor layer and a conductive protective layer. Namely, in an aspect of the present invention, a reproducing thin film magnetic head comprises a reproducing magnetoresistive element, a lead conductor layer for supplying a current to the magnetoresistive element, a conductive protective layer deposited on the lead conductor layer, a conductive bump formed on the conductive protective layer, and an insulating protective layer formed around the conductive protective layer and the conductive bump. In the thin film magnetic head, the insulating protective layer comprises a first insulating protective sub-layer formed around the conductive protective layer, the surface thereof being coplanar with the surface of the conductive protective layer, and a second insulating protective sub-layer formed separately from the first insulating protective sub-layer after the conductive bump is formed.

The present invention also can be applied to a conductive bump for supplying a current to a coil layer. In another aspect of the present invention, a recording thin film magnetic head comprises a coil layer for inducing a recording magnetic field between lower and upper core layers, a lead conductor layer for supplying a current to the coil layer, a conductive protective layer deposited on the lead conductor layer, a conductive bump formed on the conductive protective layer, and an insulating protective layer formed around the conductive protective layer and the conductive bump. In the thin film magnetic head, the insulating protective layer comprises a first insulating protective sub-layer formed around the conductive protective layer, the surface thereof being coplanar with the surface of the conductive protective layer, and a second insulating protective sub-layer formed separately from the first insulating protective sub-layer after the conductive bump is formed.

In the above-described construction, the first insulating protective sub-layer is formed to have the same height as the conductive protective layer on which the conductive bump is formed, thereby eliminating a step between the conductive protective layer and the first insulating protective sub-layer. Therefore, in separately forming the second insulating protective sub-layer after forming the conductive bump, a region without the second insulating protective sub-layer is narrowed, thereby producing no space by the polishing work for exposing the top of the conductive bump. Therefore, corrosion of the conductive bump with a polishing solution can be prevented to obtain the conductive bump having high conductivity.

The top of the insulating protective layer is polished by a CMP process or the like, and thus the insulating protective layer preferably comprises at least one inorganic insulating material selected from $Al_2O_3$, $Si_3N_4$, and $SiO_2$. The conductive protective layer is preferably composed of a metal harder than the lead conductor layer. Specifically, the conductive protective layer may have a single-layer structure or multi-layer structure containing at least one element selected from Ni, Cr, P, Pd, Pt, B and W.

The coil layer may have either a single-layer structure or a multi-layer structure. For example, when the coil layer has a two-layer structure, the coil layer comprises a first coil sub-layer, a second coil sub-layer formed on the first coil sub-layer with the first insulating protective sub-layer provided therebetween, and a contact portion passing through the first insulating protective sub-layer, the contact portion and the conductive protective layer being simultaneously formed, for conductively connecting together the first and second coil sub-layers.

Also, a plated underlying film may be formed between the first and second insulating protective sub-layers, for improving adhesion of the conductive bump.

The present invention also provides a method of manufacturing a reproducing thin film magnetic head comprising a reproducing magnetoresistive element, a lead conductor layer for supplying a current to the magnetoresistive element, a conductive protective layer deposited on the lead conductor layer, a conductive bump formed on the conductive protective layer, and an insulating protective layer formed around the conductive protective layer and the conductive bump. The manufacturing method comprises the steps of (a) forming a first insulating protective sub-layer around the conductive protective layer so that the first insulating protective sub-layer has a flat surface at the same height as the conductive protective layer, (b) forming the conductive bump on the conductive protective layer, and (c) forming a second insulating protective sub-layer on the flat surface formed by the conductive protective layer and the first insulating protective sub-layer, and on the conductive bump to form the insulating protective layer.

The present invention further provides a method of manufacturing a recording thin film magnetic head comprising a coil layer for inducing a recording magnetic field between lower and upper core layers, a lead conductor layer for supplying a current to the coil layer, a conductive protective layer deposited on the lead conductor layer, a conductive bump formed on the conductive protective layer, and an insulating protective layer formed around the conductive protective layer and the conductive bump. The manufacturing method comprises the steps of (a) forming a first insulating protective sub-layer around the conductive protective layer so that the first insulating protective sub-layer has a flat surface at the same height as the conductive protective layer, (b) forming the conductive bump on the conductive protective layer, and (c) forming a second insulating protective sub-layer on the flat surface formed by the conductive protective layer and the first insulating protective sub-layer, and on the conductive bump to form the insulating protective layer.

When the coil layer is formed in a two-layer structure, the manufacturing method further comprises the steps of (e) forming a coil insulating underlying layer on the lower core layer, (f) forming a first coil sub-layer on the coil insulating underlying layer, and (g) forming the conductive protective layer and forming a contact portion in the conductive protective layer on the coil center of the first coil sub-layer, before the step (a); and (h) a step of forming a second coil sub-layer on the first insulating protective sub-layer so that the coiling center of the second coil sub-layer is conductively connected to the contact portion, between the steps (b) and (c).

The manufacturing method may further comprise (i) a step of forming a plated underlying film on the conductive protective layer and the first insulating protective sub-layer, between the steps (a) and (b).

DESCRIPTION OF THE PREFERRED EMBODIMENTS

The present invention will be described below with reference to the drawings. In FIGS. 2, 3 and 6 to 16, the X direction coincides with the track width direction, the Y direction coincides with the depth direction, and the Z direction coincides with the movement direction of a recording medium and the lamination direction of a thin film electrode layer.

Figure 1:
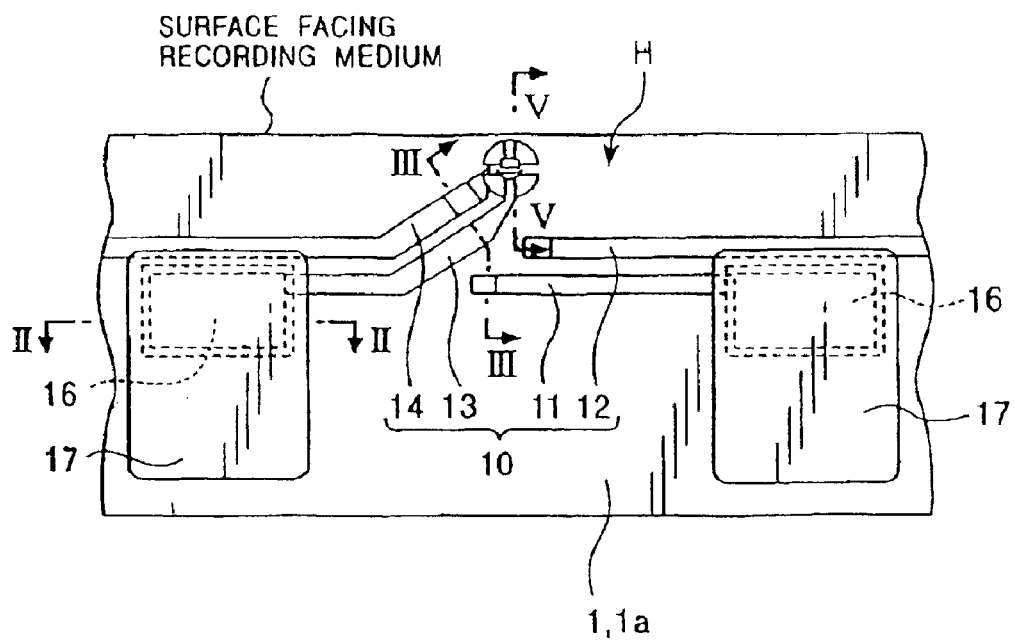
FIG. 1 is a partial plan view showing the trailing end surface of a slider on which a thin film magnetic head according to the present invention is mounted.

FIG. 1 is a partial plan view showing the trailing end surface 1a of a slider 1 on which a thin film magnetic head H is mounted. In FIG. 1, the top of the slider 1 corresponds to a surface (ABS) facing a recording medium. The slider 1 is composed of a ceramic material such as alumina titanium carbide ($Al_2O_3$—TiC) or the like, and the thin film magnetic head H is mounted near the ABS side of the trailing end surface 1a.

The thin film magnetic head H is a so-called combination-type thin film magnetic head comprising a lamination of a reproducing MR head and a recording inductive head. The thin film magnetic head H comprises lead conductor layers 10 for supplying a current to a magnetoresistive element constituting the MR head and to a coil layer constituting the inductive head. The lead conductor layers 10 include first and second electrode lead layers 11 and 12 conductively connected to the magnetoresistive element, and first and second coil lead layers 13 and 14 conductively connected to the coil layer. Each of the lead conductor layers 10 is composed of a conductive material, for example, Cu or the like.

Figure 2:
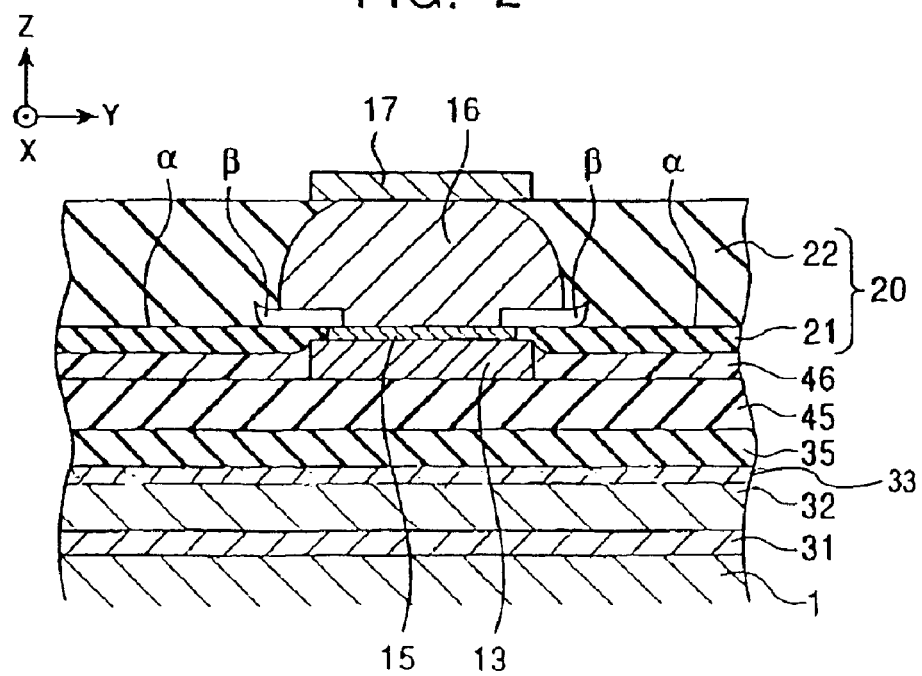
FIG. 2 is a sectional view taken-along line II—II in FIG. 1.
Figure 3:
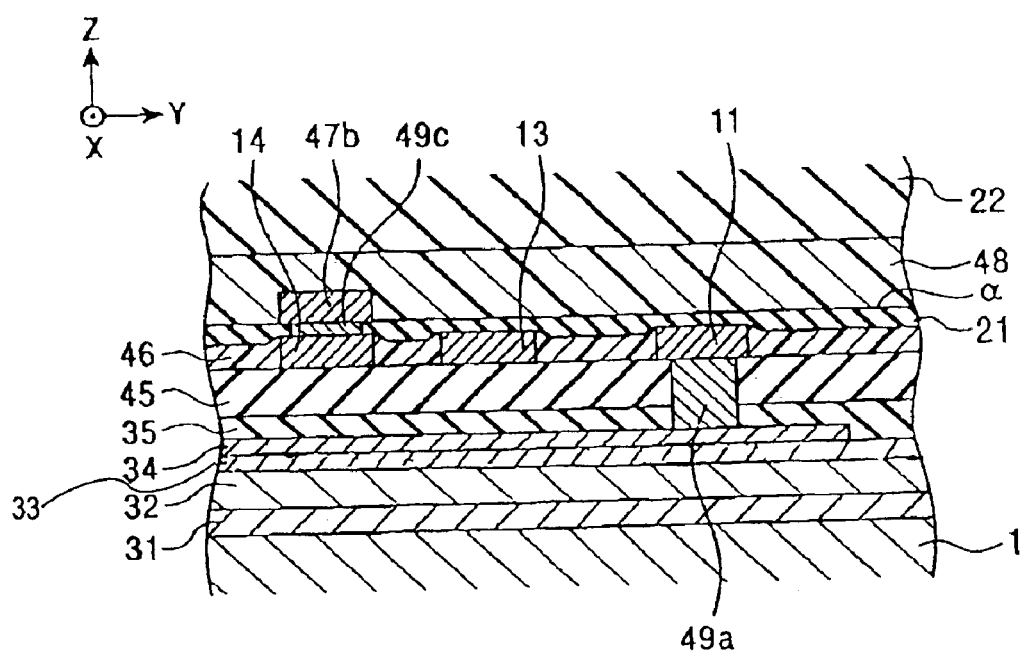
FIG. 3 is a sectional view taken along line III—III in FIG. 1.
Figure 4:
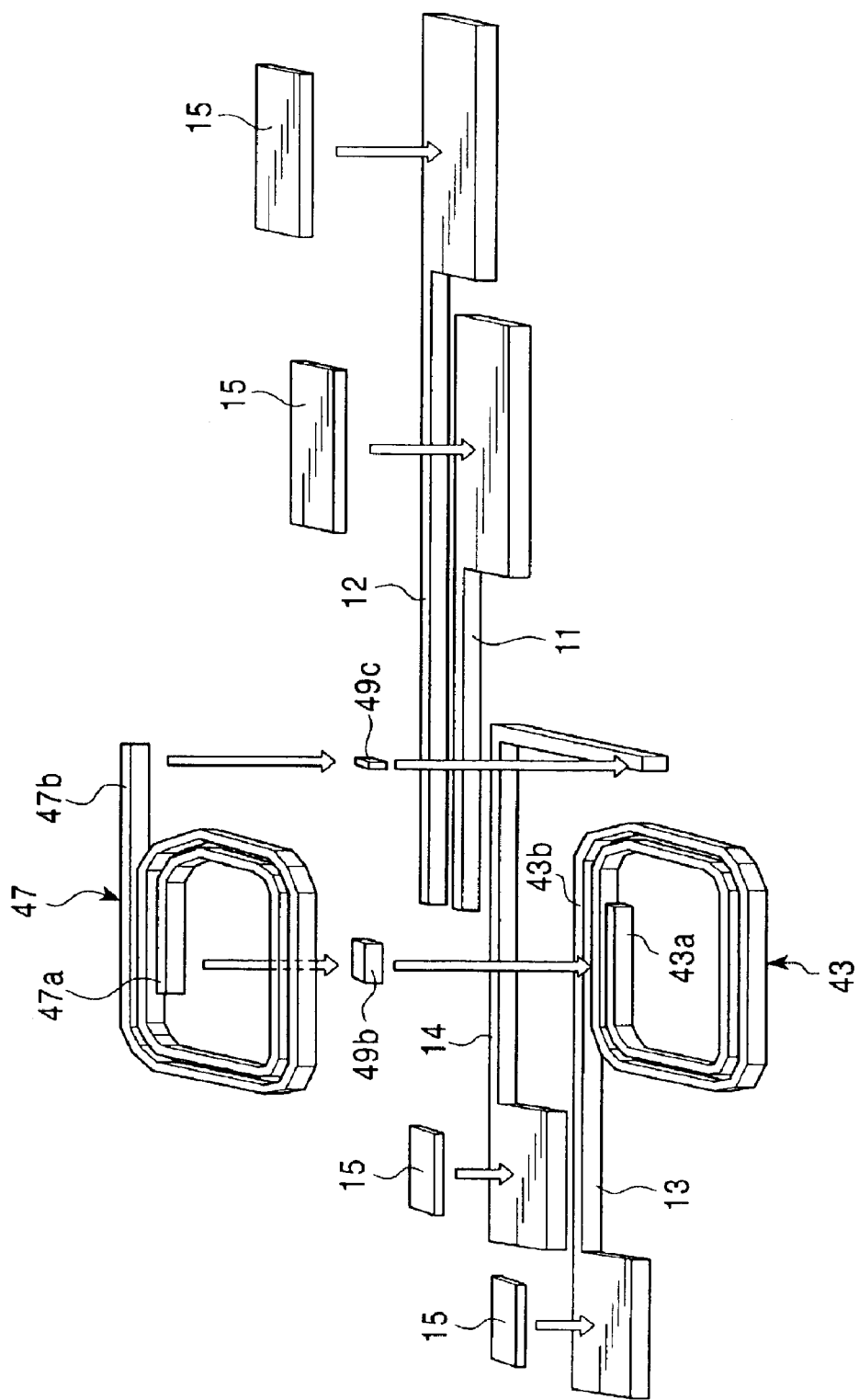
FIG. 4 is an exploded perspective view illustrating conductive connection between a coil layer and a lead conductor layer of an inductive head.

Also, a conductive protective layer 15 having a predetermined thickness is formed on an external connection portion (terminal portion) of each of the first and second electrode lead layers 11 and 12, and the first and second coil lead layers 13 and 14 (FIGS. 2 to 4). The conductive protective layers 15 are provided for preventing oxidation of the surfaces of the lead conductor layers 10, and preventing the lead conductor layers 10 from being scraped out by an ion milling process for removing the oxide layers formed on the lead conductor layers 10. Therefore, the conductive protective layers 15 are made of a harder metal material than the lead conductor layers 10. Specifically, the conductive protective layers 15 are preferably formed in a single-layer structure or multi-layer structure containing at least one element selected from Ni, Cr, P, Pd, Pt, B and W.

Furthermore, a bump (conductive bump) 16 having conductivity and an umbrella sectional shape is formed on each of the conductive protective layers 15 by plating, and an electrode pad layer 17 functioning as an external connection terminal is formed on each of the bumps 16. The electrode pad layers 17 are respectively conductively connected to the lead conductor layers 10 (the first and second electrode lead layers 11 and 12, and the first and second coil lead layers 13 and 14) through the conductive protective layers 15 and the bumps 16.

In the thin film magnetic head H, an insulating protective layer 20 is formed around the conductive protective layers 15 and the bumps 16. FIG. 2 is a sectional view taken along line II—II in FIG. 1, and shows a structure of the external connection terminal of the first coil lead layer 13. Although the bump structure at the external connection terminal of each of the first and second electrode lead layers 11 and 12, and the second coil lead layer 14 is not shown in the drawings, the bump structure of each of these layers is the same as the first coil lead layer 13 shown in FIG. 2, and thus will be described below with reference to FIG. 2.

The insulating protective layer 20 comprises a first insulating protective sub-layer 21 which is formed around the conductive protective layers 15 and which has a flat surface α at the same height as the conductive protective layers 15, and a second insulating protective sub-layer 22 formed around the bumps 16 separately from the first insulating protective sub-layer 21. The second insulating protective sub-layer 22 is formed to a thickness sufficient to cover the bumps 16, and then polished to expose the tops of the bumps 16. Each of the first and second insulating protective sub-layers 21 and 22 comprises an inorganic insulating material such as $Al_2O_3$ or the like.

When the insulating protective layer 20 comprises the first and second insulating protective sub-layers 21 and 22, the surface on which the bumps 16 are formed is entirely planarized by the conductive protective layers 15 and the first insulating protective sub-layer 21. Therefore, in separately forming the second insulating protective sub-layer 22 after forming the bumps, a region β without the second insulating protective sub-layer 22 is narrowed. Namely, no space occurs by the polishing work for exposing the tops of the bumps 16, thereby preventing corrosion of the bumps 16 with the polishing solution. Therefore, the bumps 16 having high conductivity can be obtained.

Figure 5:
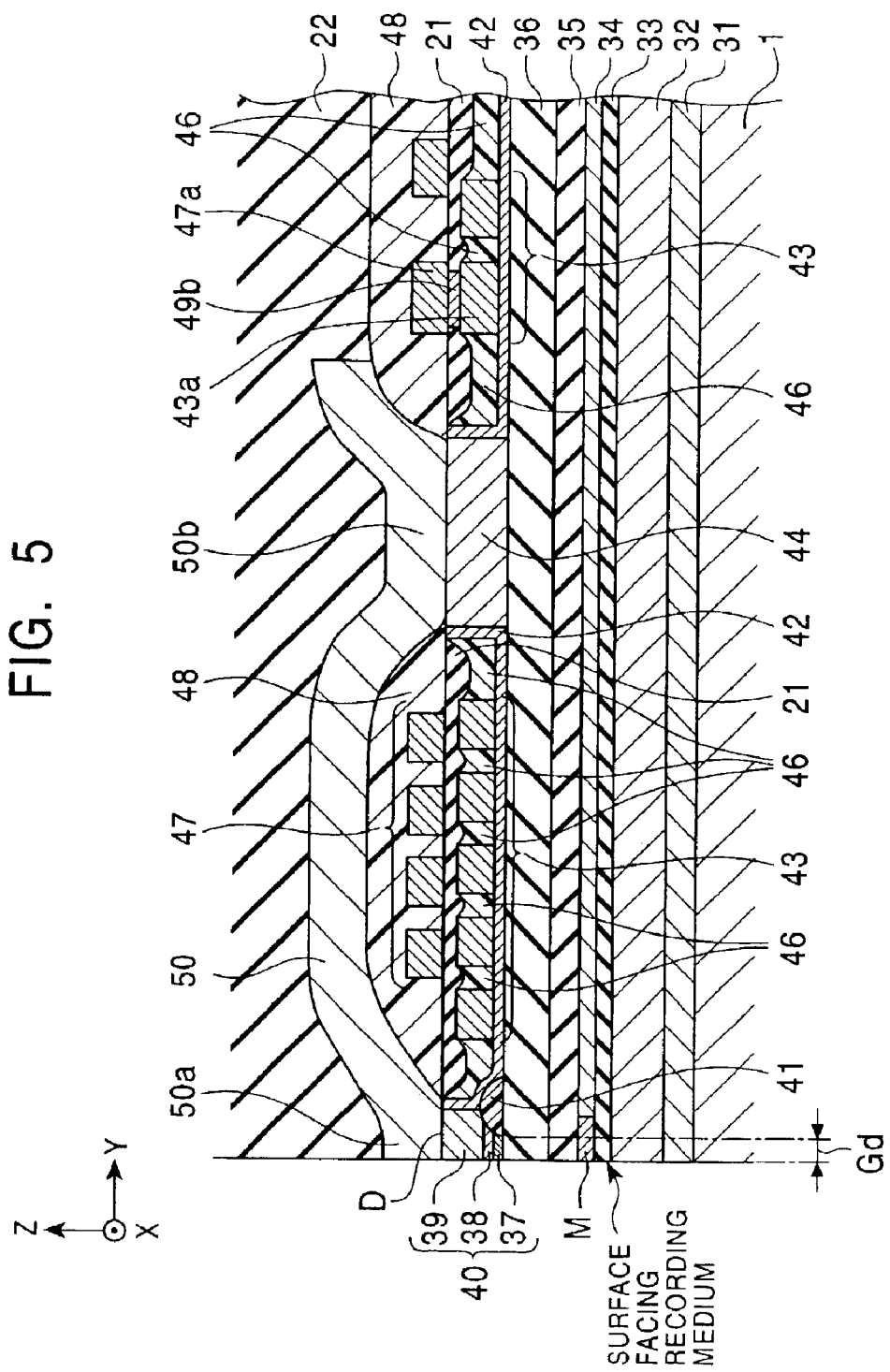
FIG. 5 is a sectional view taken along line V—V in FIG. 1.
Figure 6A:
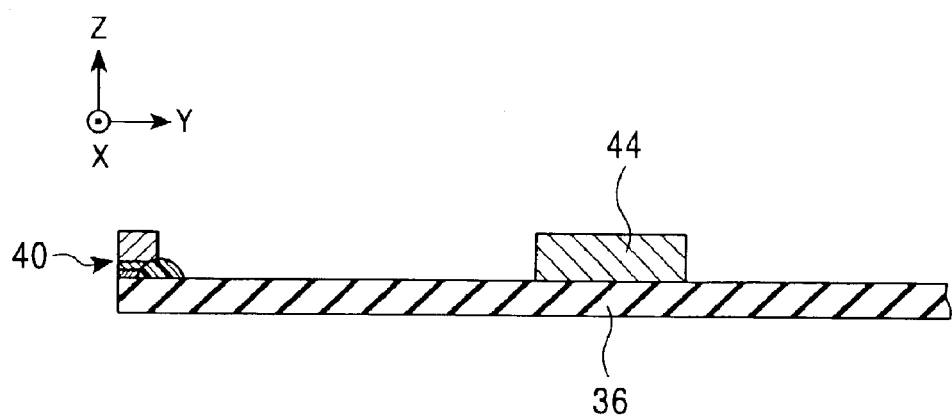
FIG. 6 consisting of FIGS. 6A and 6B is a partial sectional view showing a step of a method of manufacturing a thin film magnetic head, FIG. 6A being a sectional view taken along ling V—V in FIG. 1, and FIG. 6B being a sectional view taken along line II—II in FIG. 1.
Figure 6B:
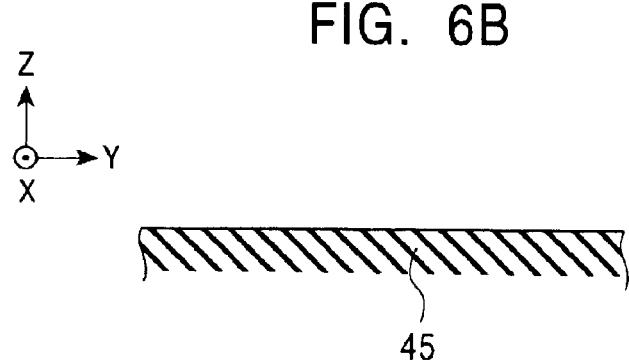

Each of the layers constituting the thin film magnetic head H will be described below with reference to FIGS. 2 to 5. FIG. 3 is a sectional view taken along line III—III in FIG. 1, and FIG. 5 is a sectional view taken along line V—V in FIG. 1. FIG. 4 is an exploded perspective view illustrating conductive connection between a coil layer and each of the lead conductor layers 10, which constitute the inductive head.

As shown in FIG. 5, an alumina undercoat layer 31, a lower shield layer 32 comprising a soft magnetic material such as permalloy (NiFe alloy), a lower gap layer 33 comprising a nonmagnetic material such as alumina or the like, and a magnetoresistive element M are formed in turn on the slider 1 along the lamination direction. The magnetoresistive element M is exposed at the ABS so that with a current applied, the resistance changes with a leakage magnetic field from a recording medium. The thin film magnetic head H reproduces a magnetic signal recorded on the recording medium based on a change in resistance of the magnetoresistive element M. As the magnetoresistive element M, a GMR (Giant Magnetoresistive) element or AMR (Anisotropic Magnetoresistive) element can be used.

An electrode layer 34 is connected to the magnetoresistive element M, the electrode layer 34 extending in the depth direction from both sides of the magnetoresistive element M in the track width direction. Furthermore, an upper shield layer 36 comprising a soft magnetic material such as permalloy (NiFe alloy) or the like is formed on the magnetoresistive element M and the electrode layer 34 through an upper gap layer 35 comprising alumina or the like. An insulating layer 45 is formed around the upper shield layer 36. The electrode layer 34 is conductively connected to the first and second electrode lead layers 11 and 12 through a first contact portion 49a and second contract portion (not shown), which are formed above the electrode layer 34 so as to pass through the upper gap layer 35 and the insulating layer 45 (FIG. 3). A lamination ranging from the lower shield layer 31 to the upper shield layer 36 constitutes the reproducing MR head.

In the thin film magnetic head H, the upper shield layer 36 functions as a lower core layer of the inductive head. Also, a magnetic pole portion 40 having a predetermined length dimension is formed to extend in the depth direction from the ABS, the track width being determined by the track width dimension of the magnetic pole portion 40. The magnetic pole portion 40 has a three-layer structure comprising a lower pole layer 37 magnetically connected to the lower core layer 36, a gap layer 38 comprising a nonmagnetic metal material, and an upper pole layer 39 magnetically connected to an upper core layer 50. Furthermore, a Gd-determining insulating layer 41 comprising, for example, a resist material or the like is formed on the lower core layer 36 at a predetermined distance from the ABS in the depth direction. The gap depth (Gd) of the thin film magnetic head H is controlled by the distance between the ABS and the tip of the Gd-determining layer 41.

Furthermore, a first coil sub-layer 43 comprising a low-resistance conductive material such as Cr or the like is formed, through a coil insulating underlying layer 42, on the lower core layer 36 to be positioned at a distance from the magnetic pole portion 40 in the depth direction. The first coil sub-layer 43 has a coiling center 43a at a predetermined distance from a back gap layer 44 in the depth direction so that the first coil sub-layer 43 has a helical shaped centered at the coiling center 43a. The pitch interval of the conductor of the first coil sub-layer 43 is filled with a first coil insulating layer 46. As the first coil insulating layer 46, an organic insulating material such as a resist material or the like is used for securely filling the pitch interval. The upper surfaces of the first coil sub-layer 43 and the first coil insulating layer 46 are coated with the first insulating protective sub-layer 21, the upper surface of the first insulating protective sub-layer 21 being coplanar with the joint surface D between the magnetic pole layer 40 and the upper core layer 50. Furthermore, a second coil sub-layer 47 having a helical shape centered at a coiling center 47a is formed on the first insulating protective sub-layer 21, and a second coil insulating layer 48 is formed to cover the upper surface of the second coil sub-layer 47 and fill in the pitch interval of the conductor of the second coil sub-layer 47. As the second coil insulating layer 48, the same organic insulating material as the first coil insulating layer 46, such as a resist material or the like, is used. The coiling direction of the second coil sub-layer 47 is opposite to that of the first coil sub-layer 43.

The coiling centers 43a and 47a of the first and second coil sub-layers 43 and 47 are conductively connected together through a third contact portion 49b. Namely, the third contact portion 49b is formed by plating to pass through the first insulating protective sub-layer 21 and to be positioned on the coiling center 43a of the first coil sub-layer 43 so that the upper surface of the third contact portion 49b is coplanar with the upper surface of the first insulating protective sub-layer 21. Then, the coiling center 47a of the second coil sub-layer 47 is set on the third contact portion 49b. The coil layer of the present invention comprises the first coil sub-layer 43, the second coil sub-layer 47, and the third contact portion 49b.

The first coil lead layer 13 is extended to the coil terminal portion 43b of the first coil sub-layer 43, and united with the first coil sub-layer 43. On the other hand, the second coil lead layer 14 is united with the coil terminal portion 47b of the second coil sub-layer 47 through a fourth contact portion 49c. As a result, the first coil sub-layer 43 is conductively connected to the first coil lead layer 13, and the second coil sub-layer 47 is conductively connected to the second coil lead layer 14. The first and second coil lead layers 13 and 14 are formed by plating on the same formation surface as the first coil sub-layer 43 in the same step. Similarly, the first and second electrode lead layers 11 and 12 are formed on the same formation surface as the first coil sub-layer 43 in the same step.

The upper core layer 50 is formed on the second coil insulating layer 48 by, for example, flame plating or the like. The front end 50a of the upper core layer 50 is magnetically connected to the upper magnetic pole layer 39, and the base end 50b of the upper core layer 50 is magnetically connected to the back gap layer 44. The upper surface of the upper core layer 50 is coated with the second insulating protective sub-layer 22.

FIGS. 6 to 15 are partial sectional views showing steps of a process for manufacturing the thin film magnetic head H. In each of FIGS. 6 to 15, FIG. A is a sectional view taken along line V—V in FIG. 1, and FIG. B is a sectional view taken along line II—II in FIG. 1. The steps for forming a structure at the external connection end of each of the first and second electrode lead layers 11 and 12, and the second coil lead layer 14 are the same as those shown in FIGS. 6B to 15B, and are thus not shown in the drawings.

In order to simplify a description, the manufacturing steps after the magnetic pole portion 40 and the back gap layer 44 are formed on the lower core layer 36 (FIG. 6) will be described below.

Figure 7A:
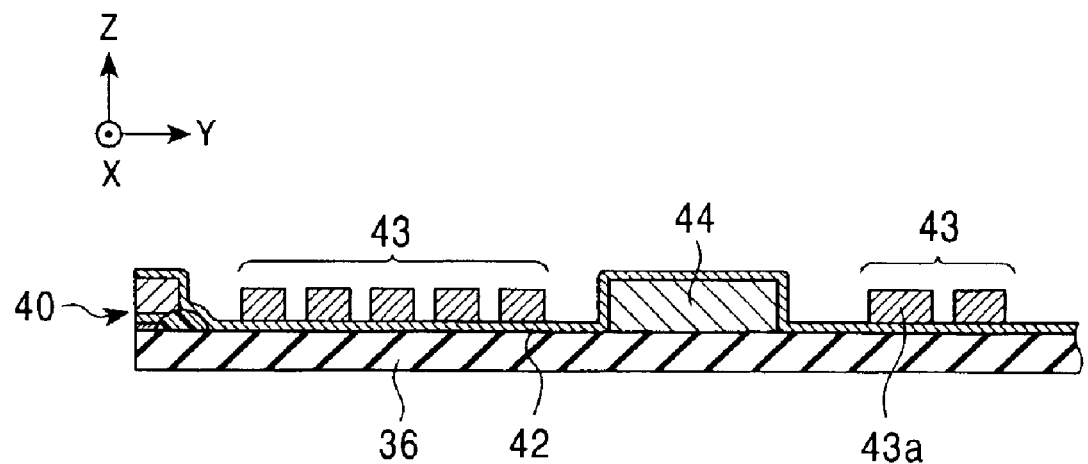
FIG. 7 consisting of FIGS. 7A and 7B is a partial sectional view showing a step after the step shown in FIG. 6, FIG. 7A being a sectional view taken along ling V—V in FIG. 1, and FIG. 7B being a sectional view taken along line II—II in FIG. 1.
Figure 7B:
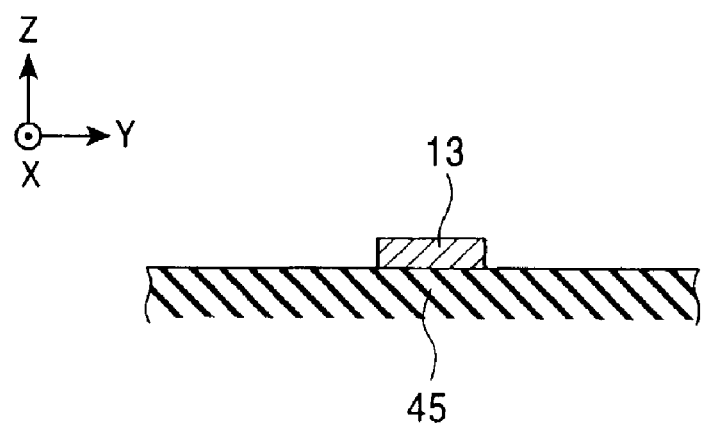

First, the coil insulating underlying layer 42 is formed to extend from the magnetic pole portion 40 to the lower core layer 36 and the back gap layer 44, and the first coil sub-layer 43 is patterned on the coil insulating underlying layer 42. In this step, the coiling center 43a of the first coil sub-layer 43 is deviated from the back gap layer 44 in the depth direction. Then, the first coil sub-layer 43 is helically formed by plating to start from the coiling center 43a (FIG. 7A). In forming the first coil sub-layer 43, the lead conductor layers 10 are simultaneously formed on the insulating layer 45 formed around the lower core layer 36. Namely, the first coil lead layer 13 is formed to be continued from the coil terminal portion 43b of the first coil sub-layer 43 (FIG. 7B and FIG. 4), and the second coil lead layer 14 is formed at a distance from the first coil sub-layer 43 (FIG. 4). Furthermore, the first and second electrode lead layers 11 and 12 are formed on the first contact portion 49a and the second contact portion (not shown) (FIGS. 3 and 4). The first contact portion 49a and the second contact portion for conductively connecting the first and second electrode lead layers 11 and 12 to the electrode layer 34 are formed before the step of forming the lower core layer 36.

Figure 8A:
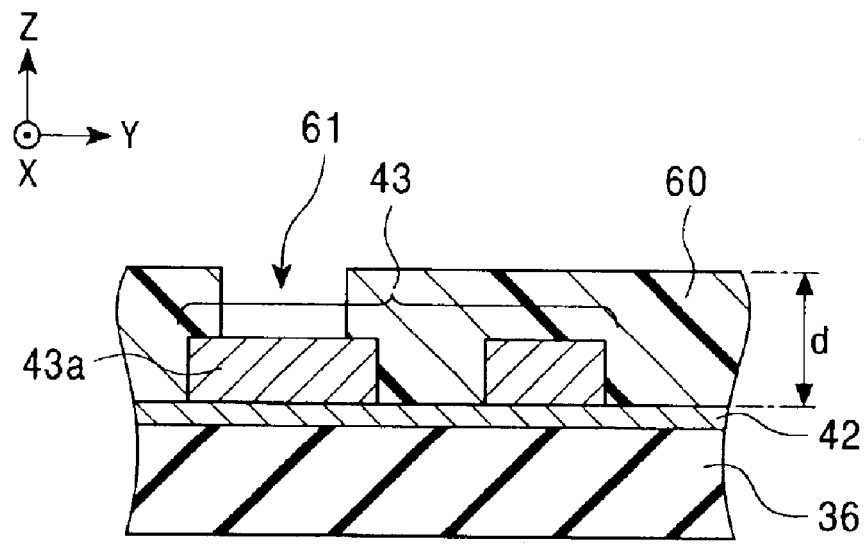
FIG. 8 consisting of FIGS. 8A and 8B is a partial cross-sectional view showing a step after the step shown in FIG. 7, FIG. 8A being a sectional view taken along ling V—V in FIG. 1, and FIG. 8B being a sectional view taken along line II—II in FIG. 1.
Figure 8B:
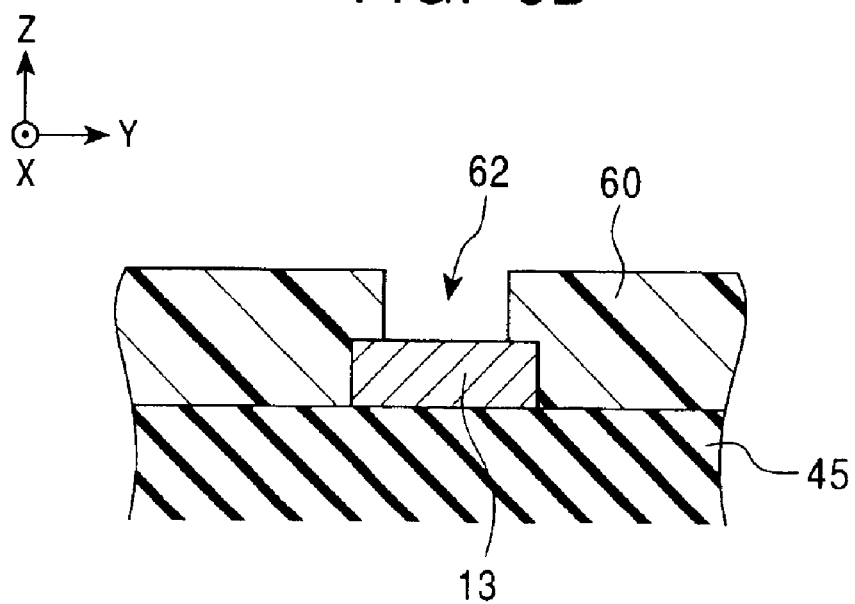
Figure 9A:
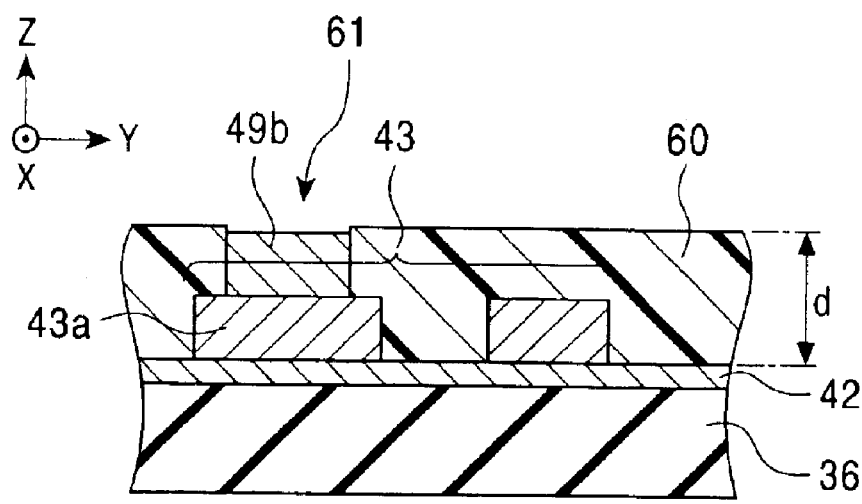
FIG. 9 consisting of FIGS. 9A and 9B is a partial cross-sectional view showing a step after the step shown in FIG. 8, FIG. 9A being a sectional view taken along ling V—V in FIG. 1, and FIG. 9B being a sectional view taken along line II—II in FIG. 1.
Figure 9B:
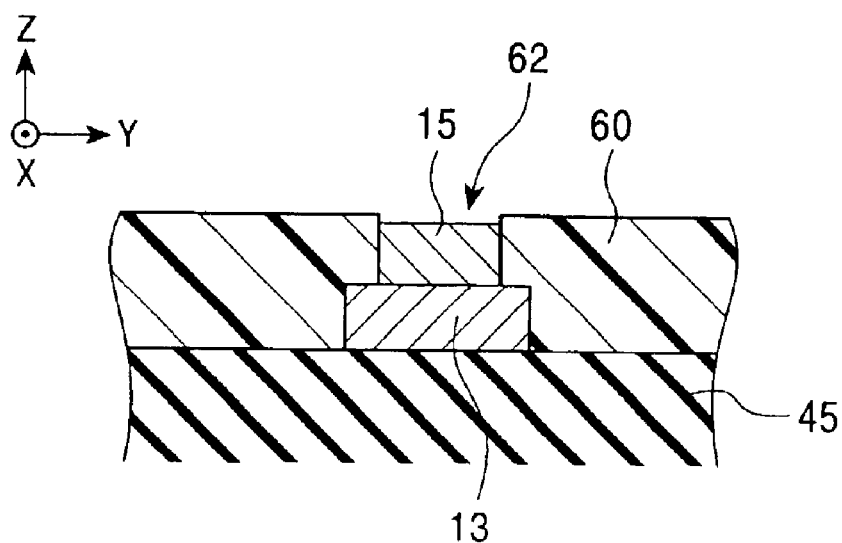
Figure 10A:
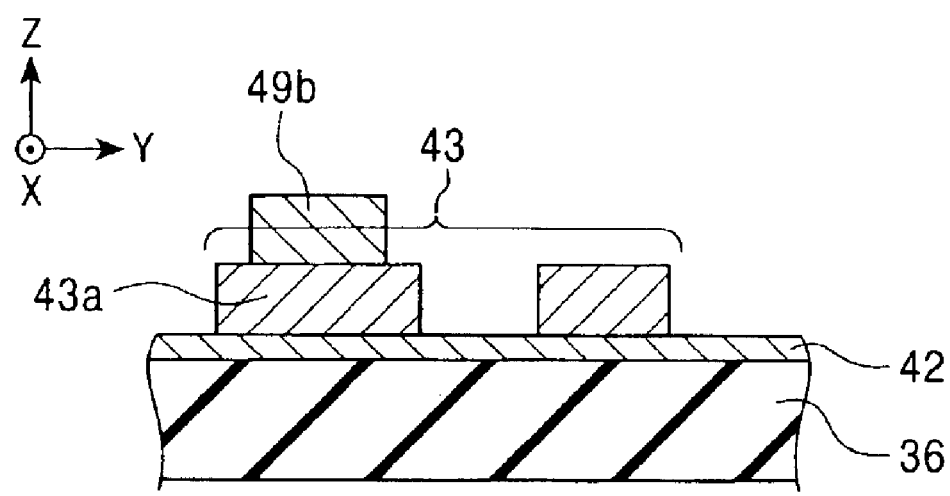
FIG. 10 consisting of FIGS. 10A and 10B is an enlarged partial cross-sectional view showing a step after the step shown in FIG. 9, FIG. 10A being a sectional view taken along ling V—V in FIG. 1, and FIG. 10B being a sectional view taken along line II—II in FIG. 1.
Figure 10B:
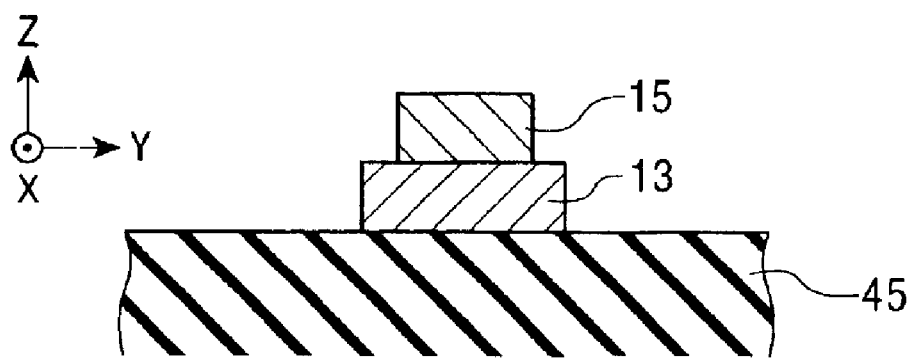

After the first coil sub-layer 43 and the lead conductor layers 10 are formed, the third and fourth contact portions 49b and 49c and the conductive protective layers 15 are formed by plating in the steps described below. First, a resist layer 60 is formed on the first coil sub-layer 43 and the lead conductor layers 10 (FIG. 8). The thickness d of the resist layer 60 is set to be substantially the same as or larger than the height dimension of the magnetic pole portion 40 in order to easily make the upper surface of the third contact portion 49b coplanar with the upper surface of the magnetic pole portion 40. Next, an aperture pattern 61 is formed in the resist layer 60 by exposure at a position above the coiling center 43a of the first coil sub-layer 43 (FIG. 8A), and an aperture pattern 62 is formed above the external connection end of the first coil lead layer 13 (FIG. 8B). Similarly, an aperture pattern (not shown) is formed below the coiling center 47a of the second coil sub-layer 47, and an aperture pattern (not shown) is formed above the external connection end of each of the first and second electrode lead layers 11 and 12 and the second coil lead layer 14. Then, as shown in FIGS. 9A and 9B, the third contact portion 49b and each conductive protective layer 15 are formed in the aperture patterns 61 and 62, respectively, by plating. At the same time, the fourth contact portion 49c and each conductive protective layer 15 are formed. Then, the resist layer 60 is removed to obtain the state shown in FIG. 10. The upper surfaces of the third and fourth contact portions 49b and 49c are coplanar with the upper surface (the joint surface D between the magnetic pole portion 40 and the upper core layer 50) of the magnetic pole portion 40.

In the above-described steps, the conductive protective layers 15 are preferably formed in a single-layer structure or multi-layer structure containing at least one element selected from Ni, Cr, P, Pd, Pt, B and W. In this structure, even if an oxide layer is formed on the conductive protective layers 15 in the manufacturing process, the thickness of the oxide layer is smaller than that of the conductive protective layers 15, and thus the oxide layer can be securely removed by ion milling or the like. During ion milling, the lead conductor layers 10 are not damaged.

Then, the pitch interval of the conductor of the first coil sub-layer 43 is filled with the first coil insulating layer 46 comprising an organic insulating material such as resist or the like. Then, the first insulating protective sub-layer 21 is formed on the first coil sub-layer 43 and the lead conductor layers 10 by sputtering (FIG. 11). The top of the first insulating protective sub-layer 21 is polished by the CMP process or the like, and thus the first insulating protective sub-layer 21 is preferably comprises an inorganic insulating material. As the inorganic insulating material, at least one material is preferably selected from $Al_2O_3$, $Si_3N_4$, and $SiO_2$. The first insulating protective sub-layer 21 is also formed on the magnetic pole portion 40 and the back gap layer 44.

Figure 11A:
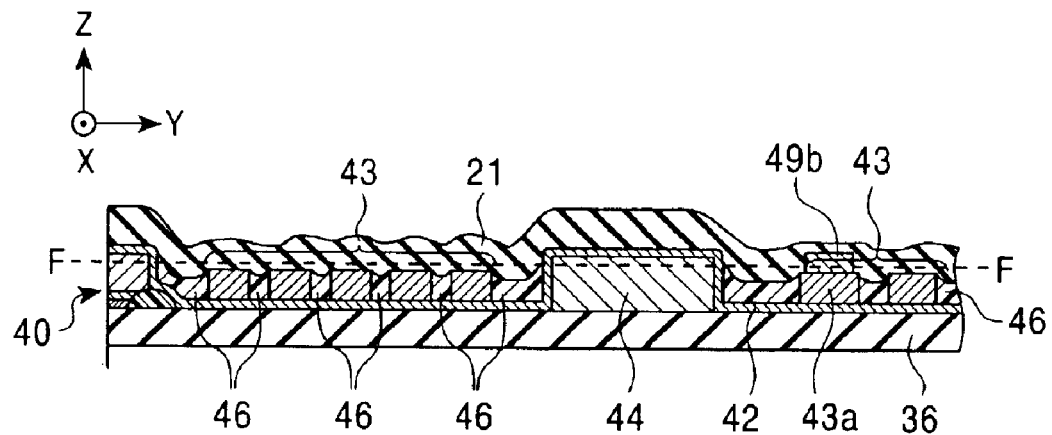
FIG. 11 consisting of FIGS. 11A and 11B is an enlarged partial cross-sectional view showing a step after the step shown in FIG. 10, FIG. 11A being a sectional view taken along ling V—V in FIG. 1, and FIG. 11B being a sectional view taken along line II—II in FIG. 1.
Figure 11B:
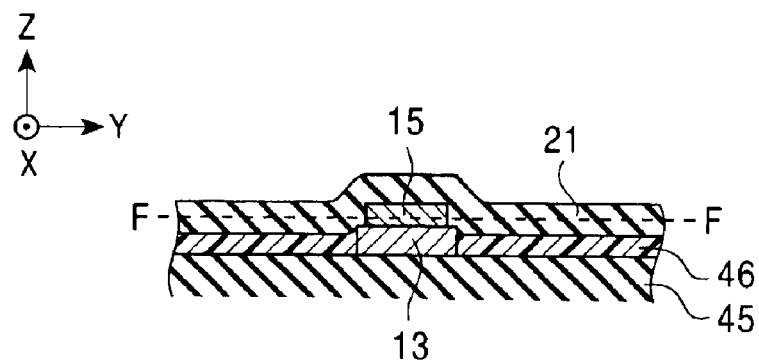
Figure 12A:
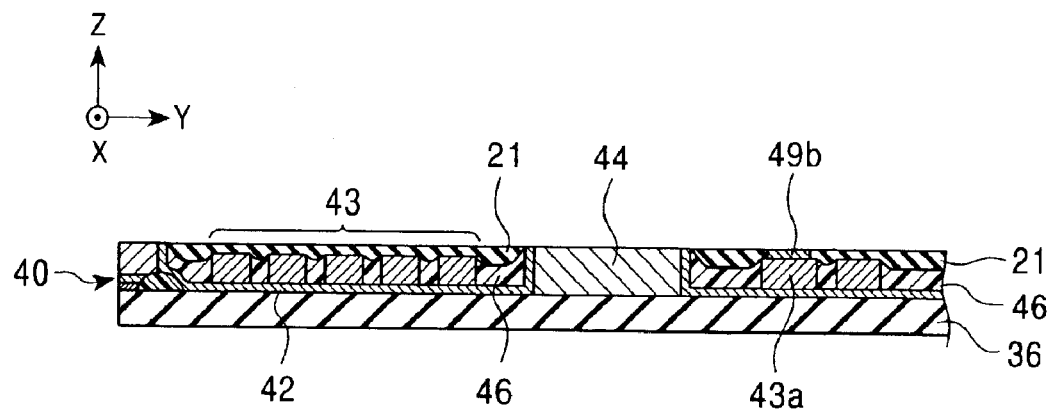
FIG. 12 consisting of FIGS. 12A and 12B is an enlarged partial cross-sectional view showing a step after the step shown in FIG. 11, FIG. 12A being a sectional view taken along ling V—V in FIG. 1, and FIG. 12B being a sectional view taken along line II—II in FIG. 1.
Figure 12B:
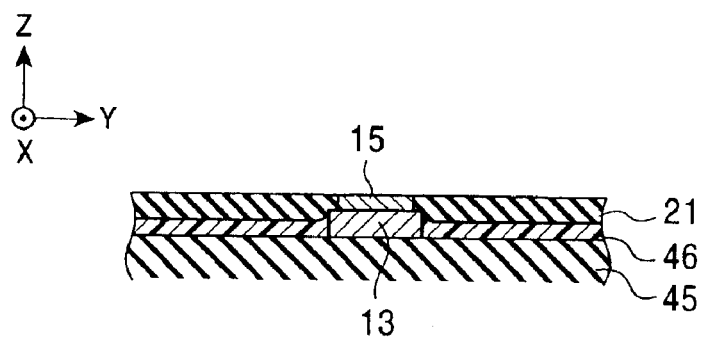

The top of the first insulating protective sub-layer 21 is polished to line F—F shown in FIG. 11A by, for example, a CMP process or the like. By polishing the first insulating protective sub-layer 21, the upper surfaces of the magnetic pole portion 40, the back gap layer 44, the third and fourth contact portions 49b and 49c, and the conductive protective layers 15 are exposed in the same plane as the upper surface of the first insulating protective sub-layer 21. As a result, flat surfaces α at the same height as the conductive protective layers 15 are formed around the conductive protective layers 15 (FIG. 12).

In the polishing work, not only the flat surfaces α are obtained, but also the oxide layers formed on the third and fourth contact portions 49b and 49c, and the conductive protective layers 15 can be removed. Therefore, adhesion between the third and fourth contact portions 49b and 49c and the second coil sub-layer 47, and adhesion between the conductive protective layers 15 and the bumps 16 can be improved. When the thin film magnetic head is exposed to air between the polishing step and the step of forming the second coil sub-layer 47 described below, the oxide layers newly formed on the conductive protective layers 15 are preferably removed by etching before the second coil sub-layer 47 is formed.

Figure 13A:
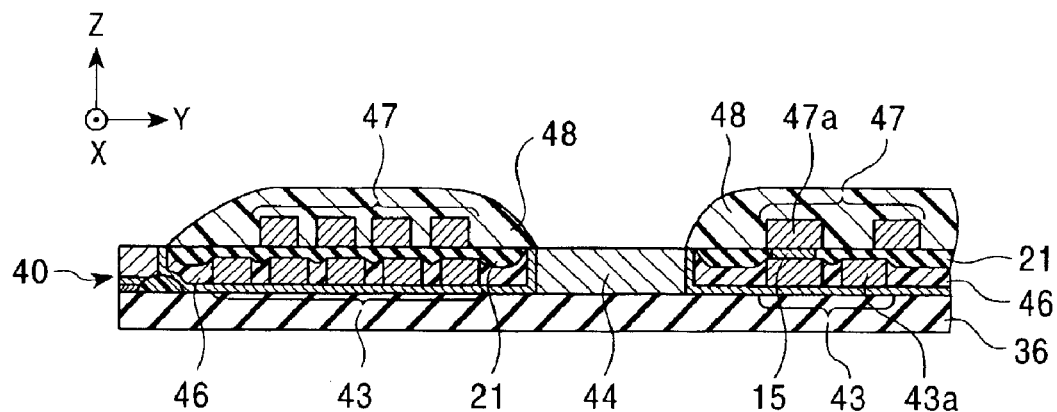
FIG. 13 consisting of FIGS. 13A and 13B is an enlarged partial cross-sectional view showing a step after the step shown in FIG. 12, FIG. 13A being a sectional view taken along ling V—V in FIG. 1, and FIG. 13B being a sectional view taken along line II—II in FIG. 1.
Figure 13B:
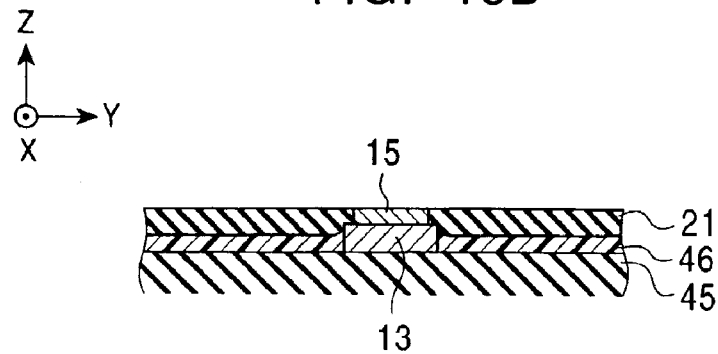
Figure 14A:
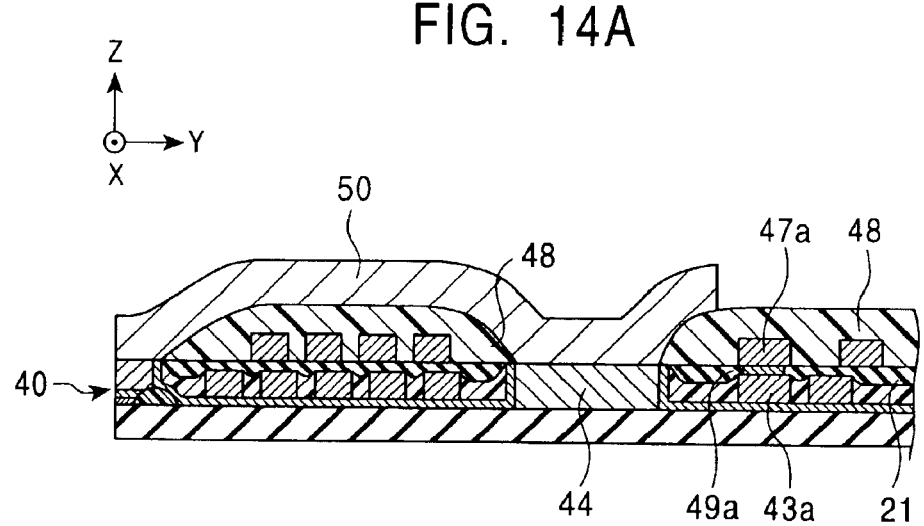
FIG. 14 consisting of FIGS. 14A and 14B is an enlarged partial cross-sectional view showing a step after the step shown in FIG. 13, FIG. 14A being a sectional view taken along ling V—V in FIG. 1, and FIG. 14B being a sectional view taken along line II—II in FIG. 1.
Figure 14B:
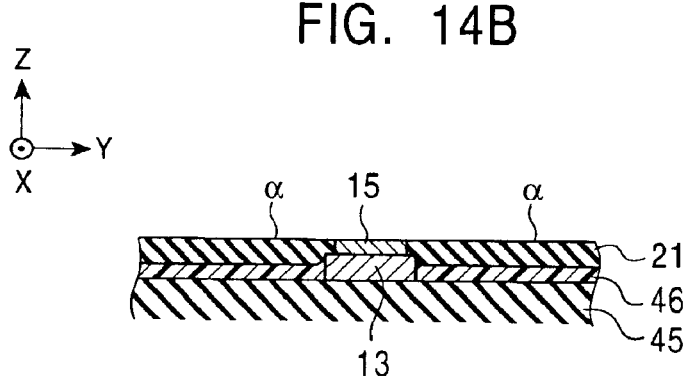

After the flat surface a are obtained, the second coil sub-layer 47 is formed on the first insulating protective sub-layer 21 by plating. In this step, me coiling center 47a of the second coil sub-layer 47 is formed on the third contact portion 49b so that the first coil sub-layer 43 is conductively connected to the second coil sub-layer 47. Then, the pitch interval of the conductor of the second coil sub-layer 47, and the second coil sub-layer 47 are covered with the second coil insulating layer 48 comprising an organic insulating material such as a resist material or the like (FIG. 13). Then, the upper core layer 50 is formed on the second coil insulating layer 48 by flame plating or the like (FIG. 14).

Figure 15A:
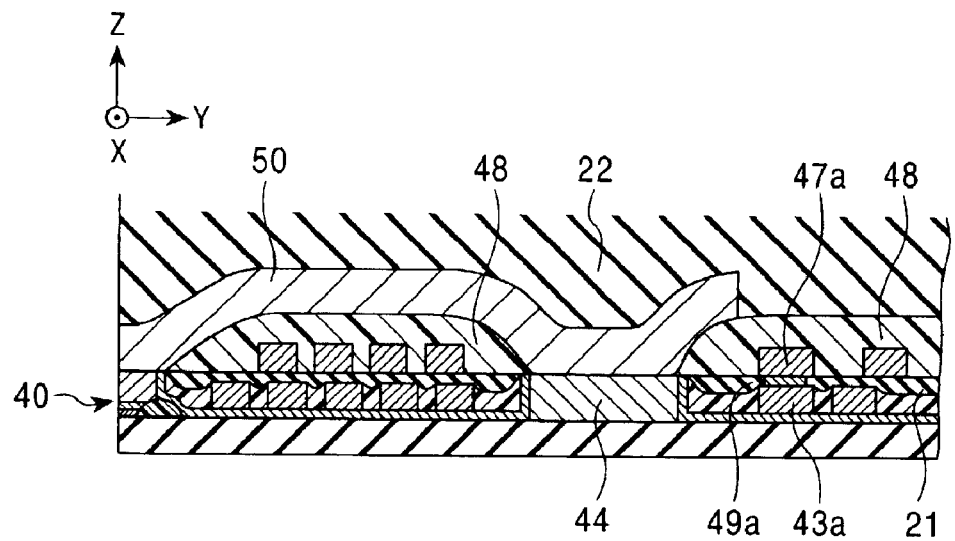
FIG. 15 consisting of FIGS. 15A and 15B is an enlarged partial cross-sectional view showing a step after the step shown in FIG. 14, FIG. 15A being a sectional view taken along ling V—V in FIG. 1, and FIG. 15B being a sectional view taken along line II—II in FIG. 1.

After the upper core layer 50 is formed, the bumps 16 shown in FIG. 15, which have an umbrella sectional shape, are formed on the conductive protective layers 15 having the flat surfaces by plating a conductive material such as Cu or the like. Then, the second insulating protective sub-layer 22 is formed by sputtering to cover the upper core layer 50 and the peripheries of the bumps 16 (FIG. 15). In this process, the surfaces (surfaces (flat surfaces α) on which the bumps 16 are formed) on which the second insulating protective sub-layer 22 is formed by sputtering are entirely planarized, thereby causing no step. Therefore, the second insulating protective sub-layer 22 can be substantially uniformly formed. Namely, the region β without the second insulating protective sub-layer 22 can be narrowed to prevent the occurrence of spaces by the polishing work for exposing the tops of the bumps 16 in the subsequent step, thereby preventing the problem of gathering the polishing solution in the spaces. Therefore, corrosion of the bumps 16 with the polishing solution can be prevented to secure good conductivity of the bumps 16.

Figure 15B:
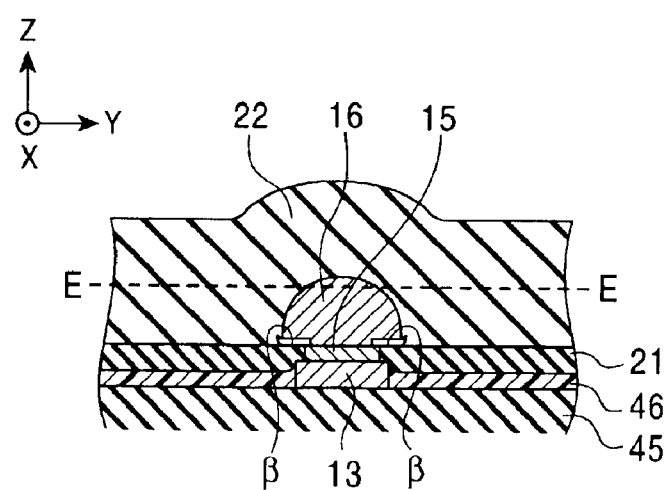
Figure 16:
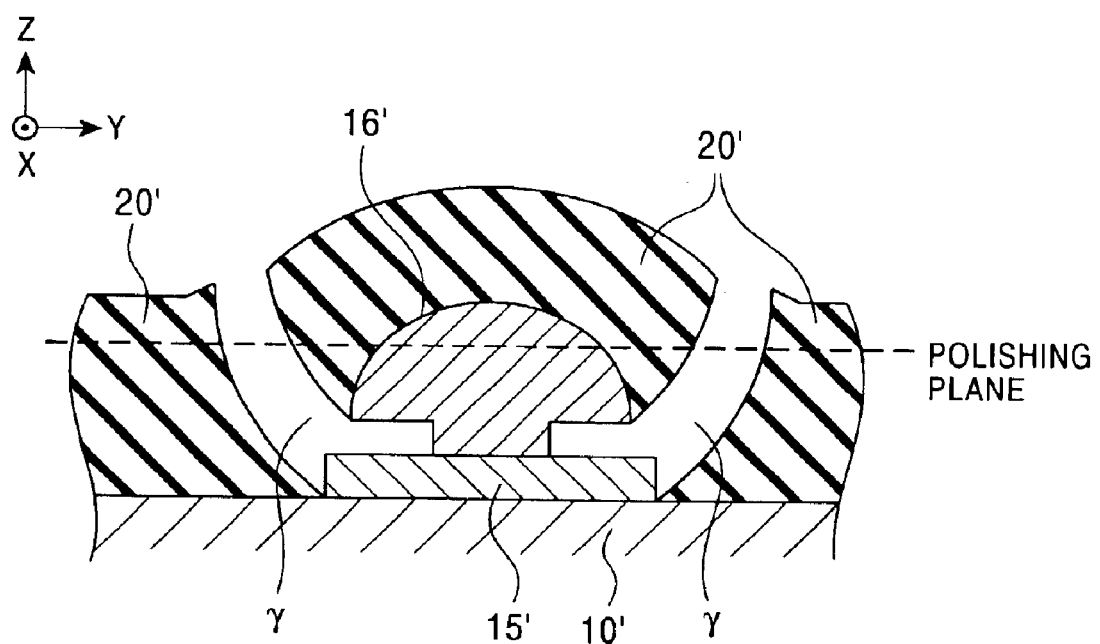
FIG. 16 is a partial sectional view showing a conventional bump structure.

Then, the second insulating protective sub-layer 22 is polished to line E—E shown in FIG. 15B by, for example, a CMP process or the like. In this polishing step, the tops of the bumps 16 are exposed. Then, the electrode pad layer 17 is formed on the exposed surface of each of the bumps 16 to form the external connection terminal. As a result, the thin film magnetic head H shown in FIGS. 2 and 5 is obtained.

In the above-described thin film magnetic head H, the first insulating protective sub-layer 21 is formed at the same height as the conductive protecting layers 15 so as to planarize the surfaces on which the bumps 16 are formed. As described above, when no step occurs between the conductive protecting layers 15 and the first insulating protective sub-layer 21, a region β without the second insulating protective sub-layer 22 is narrowed in the step of forming the second insulating protective sub-layer 22 after the bumps 16 are formed, thereby preventing the occurrence of a space by the polishing work for exposing the tops of the bumps 16. Therefore, corrosion of the bumps 16 with the polishing solution can be prevented to achieve the bumps 16 with high conductivity.

Although, in this embodiment, the second insulating protective sub-layer 22 is formed directly on the first insulating protective sub-layer 21 in the peripheries of the bumps 16, a plated underlying film may be formed between the first and second insulating protective sub-layers 21 and 22. By forming the plated underlying film, adhesion of the bumps 16 can be further improved.

Although, in this embodiment, a coil layer has a two-layer structure, the present invention can also be applied to a coil layer having a single-layer structure or a multi-layer structure comprising at least two layers.

Although, in the above-described embodiment, the present invention is applied to a combination-type thin film magnetic head comprising a lamination of a reproducing MR head and a recording inductive head, the present invention can also be applied to a reproduction-only thin film magnetic head and a record-only thin film magnetic head.

According to the present invention, a thin film magnetic head comprising bumps capable of securing high conductivity, and a manufacturing method therefor can be obtained.

What is claimed is:

1. A thin film magnetic head comprising a reproducing magnetoresistive element, a lead conductor layer that supplies a current to the magnetoresistive element, a conductive protective layer deposited on the lead conductor layer, a conductive bump formed on the conductive protective layer, and an insulating protective layer formed around the conductive protective layer and the conductive bump, wherein the insulating protective layer comprises a first insulating protective sub-layer formed around the conductive protective layer, a surface thereof being coplanar with a surface of the conductive protective layer, and a second insulating protective sub-layer formed separately from the first insulating protective sub-layer after the conductive bump is formed.

2. A thin film magnetic head according to claim 1, wherein the second insulating protective sub-layer is formed around the conductive bump, a surface thereof being coplanar with a surface of the conductive bump.

3. A thin film magnetic head according to claim 1, wherein the insulating protective layer comprises at least one inorganic insulating material selected from $Al_2O_3$, $Si_3N_4$, and $SiO_2$.

4. A thin film magnetic head according to claim 1, wherein the conductive protective layer has one of a single-layer structure and multi-layer structure containing at least one element selected from Ni, Cr, P, Pd, Pt, B and W.

5. A thin film magnetic head according to claim 1, further comprising a plated underlying film formed between the first and second insulating protective sub-layers.

6. A thin film magnetic head comprising a coil layer for inducing a recording magnetic field between lower and upper core layers, a lead conductor layer that supplies a current to the coil layer, a conductive protective layer deposited on the lead conductor layer, a conductive bump formed on the conductive protective layer, and an insulating protective layer formed around the conductive protective layer and the conductive bump, wherein the insulating protective layer comprises a first insulating protective sub-layer formed around the conductive protective layer, a surface thereof being coplanar with a surface of the conductive protective layer, and a second insulating protective sub-layer formed separately from the first insulating protective sub-layer after the conductive bump is formed.

7. A thin film magnetic head according to claim 6, wherein the second insulating protective sub-layer is formed around the conductive bump, a surface thereof being coplanar with a surface of the conductive bump.

8. A thin film magnetic head according to claim 6, wherein the insulating protective layer comprises at least one inorganic insulating material selected from $Al_2O_3$, $Si_3N_4$, and $SiO_2$.

9. A thin film magnetic head according to claim 6, wherein the conductive protective layer has one of a single-layer structure and multi-layer structure containing at least one element selected from Ni, Cr, P, Pd, Pt, B and W.

10. A thin film magnetic head according to claim 6, wherein the coil layer comprises a first coil sub-layer, a second coil sub-layer formed on the first coil sub-layer with the first insulating protective sub-layer therebetween, and a contact portion extending through the first insulating protective sub-layer, the contact portion and the conductive protective layer being simultaneously formed, conductively connecting together the first coil sub-layer to the second coil sub-layer.

11. A thin film magnetic head according to claim 6, further comprising a plated underlying film formed between the first and second insulating protective sub-layers.

\* \* \* \* \*